United States Patent [19]

Yamaguchi

[11] Patent Number: 5,468,193
[45] Date of Patent: Nov. 21, 1995

[54] INSCRIBED PLANETARY GEAR DEVICE HAVING POWDER INJECTION MOLDED EXTERNAL GEAR

[75] Inventor: Katuyoshi Yamaguchi, Nagoya, Japan

[73] Assignee: Sumitomo Heavy Industries, Ltd., Tokyo, Japan

[21] Appl. No.: 122,667

[22] Filed: Sep. 17, 1993

Related U.S. Application Data

[63] Continuation-in-part of Ser. No. 19,827, Feb. 19, 1993, abandoned, which is a continuation of Ser. No. 778,547, Oct. 18, 1991, abandoned.

[30] Foreign Application Priority Data

Oct. 25, 1990 [JP] Japan ..................... 2-288019

[51] Int. Cl.$^6$ ........................................... F16W 1/32
[52] U.S. Cl. ........................ 475/162; 475/901; 419/37; 419/58
[58] Field of Search ................... 475/162, 901; 74/DIG. 10; 419/37, 40, 46, 41; 29/893

[56] References Cited

U.S. PATENT DOCUMENTS

| | | | |
|---|---|---|---|
| 2,209,201 | 7/1940 | Hill | 74/309 |
| 2,704,465 | 3/1955 | Haller | 74/434 |
| 3,191,453 | 6/1965 | Hoven | 74/432 |
| 3,678,557 | 7/1972 | Howard | 29/893.37 |
| 3,733,921 | 5/1973 | Carveth | 29/893.37 |
| 3,762,236 | 10/1973 | Dunn et al. | 74/434 |
| 3,842,646 | 10/1974 | Kuhn | 29/893.37 |
| 4,415,528 | 11/1983 | Wiech, Jr. | 419/46 |
| 4,478,790 | 10/1984 | Huther et al. | 419/37 X |
| 4,662,939 | 5/1987 | Reinshagen | 419/38 X |
| 4,836,980 | 6/1989 | Kashiwadani et al. | 419/37 X |
| 4,921,665 | 5/1990 | Klar et al. | 419/37 X |
| 4,948,426 | 8/1990 | Kato et al. | 419/37 X |
| 5,030,184 | 7/1991 | Rennerfelt | 475/162 |
| 5,077,002 | 12/1991 | Fried | 419/29 |
| 5,250,254 | 10/1993 | Achikita et al. | 419/37 |
| 5,283,031 | 2/1994 | Osagawara et al. | 419/58 |

FOREIGN PATENT DOCUMENTS

| | | | |
|---|---|---|---|
| 797130 | 4/1936 | France. | |
| 990493 | 9/1951 | France. | |
| 7623936 | 4/1977 | France. | |
| 3325037 | 7/1984 | Germany. | |
| 403239843 | 10/1991 | Japan | 475/162 |
| 15179 | of 1905 | United Kingdom | 475/162 |
| 500233 | 2/1939 | United Kingdom | 475/162 |

*Primary Examiner*—Dirk Wright
*Assistant Examiner*—Khoi Q. Ta
*Attorney, Agent, or Firm*—Nikaido, Marmelstein, Murray & Oram

[57] ABSTRACT

An inscribed planetary gear device usable as a speed reducer or an overdrive has a primary shaft which serves, for example, as an input shaft, an externally-toothed gear carried at an eccentricity by the primary shaft; an internally-toothed gear inscribed by the externally-toothed gear; and a secondary shaft which serves, for example, as an output shaft and connected to the externally-toothed gear, through an Oldham's ring which transmits to the secondary shaft only the rotation of the externally-toothed gear taking place about the axis of the externally-toothed gear. The externally-toothed gear is provided with a counter flange at an end facing the Oldham's ring and is operatively connected to the Oldham's ring through Oldham's projections and Oldham's grooves receiving Oldham's projections provided on the Oldham's ring and the counter flange, respectively, or vice versa. The externally-toothed gear is formed by metal powder injection molding and, during sintering process, is placed on a furnace bed while contacting the counter flange with the furnace bed. In this manner, the sintered gear is prevented from being distorted.

6 Claims, 5 Drawing Sheets

INSCRIBED PLANETARY GEAR DEVICE HAVING POWDER INJECTION MOLDED EXTERNAL GEAR

CROSS REFERENCE TO RELATED APPLICATION

This is a continuation in part of patent application Ser. No. 08/019827 filed on Feb. 19, 1993 now abandoned which in turn is a continuation application of patent application Ser. No. 07/778,547 filed Oct. 18, 1991 now abandoned.

BACKGROUND OF THE INVENTION

The present invention relates to an inscribed planetary gear device which is suitable for use as a speed reducer or an overdrive, particularly a speed reducer or an overdrive which is required to have a compact construction and to transmit large power.

Hitherto, an inscribed planetary gear device has been known which has a primary shaft, an externally-toothed gear carried by the primary shaft at an eccentricity, an internally-toothed gear inscribed by the externally-toothed gear, and a secondary shaft connected to the externally-toothed gear through a means which transmits only the rotation of the externally-toothed gear which takes place about the axis of the externally-toothed gear.

An example of this known structure is shown in FIG. 3. This example is intended for use as a speed reducer, with the primary and secondary shafts serving as an input shaft and an output shaft, respectively, and the internally-toothed gear being held stationary.

In the prior art device, an eccentric member 3 is mounted on the input shaft 1, and an externally-toothed gear 5 is fitted on the eccentric member 3. The externally-toothed gear 5 has a plurality of inner roller holes 6 which receive inner rollers 8 carried by inner pins 7.

The externally-toothed gear 5 is provided, on the outer peripheral surface thereof, with teeth of trochoidal or arcuate form. These teeth mesh with internal teeth of an internally-toothed gear 10 which is fixed to a casing 12.

The inner pins 7, extending through the externally-toothed gear 5 are fixed to a flange 14 of the output shaft 2 or tightly fitted in holes formed in the flange 14. One full rotation of the input shaft 1 causes one full rotation of the eccentric member 3. As a result of rotation of the eccentric member 3, the externally-toothed gear 5 tends to revolve around the input shaft 1. The internally-toothed gear 10, however, prevents the externally-toothed gear 5 from rotating about its own axis. As a consequence, the externally-toothed gear 5 revolves while inscribing the internally-toothed gear 10, without making substantial rotation.

It is assumed here that the number of the teeth on the externally-toothed gear 5 is N, while the number of the teeth of the internally-toothed gear 10 is N+1, i.e., that the difference in the number of teeth between these two types of gears is 1. In this case, the rotational phase of the externally-toothed gear 5 is deviated by one pitch of the teeth of this gear 5 with respect to the internally-toothed gear 10 for each full rotation of the input shaft 1. Namely, the externally-toothed gear 5 rotates through an angle corresponding to one pitch of the teeth thereof. This means that one full rotation of the input shaft is reduced to $-1/N$ rotation of the externally-toothed gear.

Oscillating components of movement of the externally-toothed gear are absorbed by the presence of gaps between the inner roller holes 6 and the inner rollers 8 and the inner rollers 8 and the inner pins 7 so that only the rotation of the externally-toothed gear 5 is transmitted to the output shaft 2 through the inner pins 7.

Consequently, a speed reduction at a reduction ratio $-1/N$ can be achieved.

In this known arrangement, the internally-toothed gear is fixed and the primary and secondary shafts are respectively used as the input shaft and the output shaft. This, however, is only illustrative and a reduction can also be achieved by using the internally-toothed gear as the output shaft while fixing the secondary shaft. It is also possible to use the illustrated arrangement as an overdrive by replacing the input and output shafts with each other in the described arrangement.

Conventionally, speed reducers and overdrives employing the described inscribed planetary gear structure are produced substantially by machining alone. Machining has been chosen as the manufacturing method of choice in order to meet the requirements for high dimensional precision of the components, such as the primary and secondary shafts, internally-toothed gear and the externally-toothed gear, as well as for smoothness of the surfaces of these components.

Mass-production by mechanical processing of these components, particularly those for compact speed reducers or overdrives, is difficult to conduct. Consequently, much labor and cost are required in the production of such compact speed reducers and overdrives.

It is possible to fabricate these components by press or die-casting method, but such methods cannot provide required levels of precision and strength, thus failing to meet the requirement for ability of the gears to transmit large amounts of power, although they are suitable for mass-production.

These components also could be formed from plastics by molding. Such a method provides advantages in the production of compact speed reducers or over-drives, such as improvement in the assembly efficiency, decrease in the number of parts and reduction in the production cost. The components molded from plastics, however, cannot provide the amount of strength which is required for transmission of large amounts of power. Furthermore, these components are not usable at high temperatures, which makes it difficult to continuously operate the speed reducer or the overdrive.

It is also possible to fabricate these major components by sintering. This method offers advantages such as reduction in the cost and ease of mass production of small-sized speed reduces or overdrives. Sintered parts, however, generally have low levels of density and, hence, are more fragile than ordinary steel materials. In order to eliminate this problem, it is necessary that the low density sintered parts are post subjected to a heat treatment which tends to degrade the dimensional precision of the sintered parts, often requiring a subsequent mechanical processing, such as machining. Sintering is a kind of press work and, therefore products produced by sintering, inherently have an inferior degree of concentricity. The parts fabricated by sintering, therefore, must be completed to specification by mechanical finishing work in order to attain high degree of axial precision of the parts which is an essential requirement in speed reducers or overdrives of the inscribed planetary gear type to which the present invention pertains.

Furthermore, sintered parts generally have inferior smoothness of surfaces due to use of a material having comparatively large grains. Therefore, a sintered part, e.g., a gear, is likely to encounter problems concerning rolling fatigue strength. The use of a powder of comparatively large grain size, as the material from which a part of a compact speed reducer or overdrive is formed inevitably reduces the modules of the gear teeth, with the result that the formation of the gear teeth is restricted. Furthermore, the pores existing in such a sintered part function as notches which undesirably reduce bending strength at the feet of projections such as teeth.

Sintering also has various other disadvantages. For instance, it is to be noted that only two-dimensional forming is possible by sintering. In addition, it is difficult to obtain parts having stepped configurations by sintering, due to restriction by the use of press jigs. Furthermore, it is not easy to sinter a thin-walled part, e.g., 1.5 mm or thinner, and elongated parts.

SUMMARY OF THE INVENTION

Accordingly, an object of the present invention is to provide an inscribed planetary gear device which is small in size but yet is capable of transmitting a large amount of power, is capable of withstanding long continuous operation, and which can easily be mass-produced at a reduced cost, where at least one part of the device is formed by a metal powder injection molding process, thereby overcoming the above-described problems of the prior art.

To this end, according to one aspect of the present invention, there is provided an inscribed planetary gear device, comprising: a primary shaft; an externally-toothed gear having an axially extending cylindrical bore fitted around a bearing carried at an eccentricity by said primary shaft; an internally-toothed gear inscribed by said externally-toothed gear; a secondary shaft extending coaxially with said primary shaft; and an Oldham's ring disposed between said externally-toothed gear and said secondary shaft for transmitting to said secondary shaft only the rotation of said externally-toothed gear taking place about the axis of said externally-toothed gear; wherein said Oldham's ring is formed with at least one Oldham's projection projecting toward said externally-toothed gear, said externally-toothed gear is provided with a counter flange at an end thereof on the side of said Oldham's ring to extend radially inwardly, said flange being formed with at least one Oldham's groove to receive said Oldham's projection, and said externally-toothed gear is formed by metal powder injection molding.

According to another aspect of the present invention, there is provided an inscribed planetary gear device, comprising: a primary shaft; an externally-toothed gear having an axially extending cylindrical bore fitted around a bearing carried at an eccentricity by said primary shaft; an internally-toothed gear inscribed by said externally-toothed gear; a secondary shaft extending coaxially with said primary shaft; an Oldham's ring disposed between said externally-toothed gear and said secondary shaft for transmitting to said secondary shaft only the rotation of said externally-toothed gear taking place about the axis of said externally-toothed gear; wherein said Oldham's ring is formed with at least one Oldham's groove and said externally-toothed gear is provided with a counter flange at an end thereof on the side of said Oldham's ring to extend radially inwardly, said flange being formed with at least one Oldham's projection projecting toward said Oldham's ring and received by said Oldham's groove, and said externally-toothed gear is formed by metal powder injection molding.

The metal powder injection molding is a method which has been practiced in recent years as a substitute for conventional production methods such as mechanical processing, die-casting, powder metallurgy and lost-wax method.

The metal powder injection molding process usually has the steps of kneading a mixture of a metal powder having a mean grain size of 10 µm or so and an organic binder at an elevated temperature or normal temperature so as to obtain a uniform mixture, pelletizing the mixture by means of a pelletizer so as to obtain an injectable material, and forming an article by injecting this material by means of an injection molding machine, into a mold.

The product obtained from an injection molding machine is generally referred to as "green part". The green part is then subjected to a treatment for removing the binder component, such as heating, decompression, pressurizing, extraction or over-critical method. The part after the removal of the binder component is generally referred to as "brown part". The brown parts are then sintered in a gas atmosphere of, for example, $N_2$, $H_2$ or $NH_3$, or in a vacuum. The sintered part is generally referred to as "white part".

The production method relying upon metal powder injection molding to form the green part is optimum for use in the mass-production of small-size parts having intricate configurations, such as the parts of an inscribed planetary gear device to which the present invention pertains. Namely, the injection molding provides a high dimensional precision, while the use of metal powder ensures the production of products having a high strength which enables these products to transmit large amounts of power. In addition, this method enables mass-production of parts at a comparatively low cost. The parts fabricated by this method can withstand high temperatures, so that the device assembled from such parts can withstand long continuous operation.

In the metal powder injection molding, however, there has been raised such a problem that when the brown part is sintered, to be converted into the white part, the part is largely shrunk. Unfortunately shrinkage is not smoothly effected due to frictional resistance force generated on the contact surface between the part and a furnace bed on which the part is located. This problem is exacerbated if the part is in contact with the furnace bed through a smaller contact area so as to increase the frictional resistance force per unit area.

If the metal powder injection molding is applied to a conventional externally-toothed gear having a simple cylindrical form, during sintering the externally-toothed gear should be placed on the furnace bed while the end surface of a relatively small area is contacted with the furnace bed so that the downward force due to the weight of the externally toothed gear acts on the furnace bed through the relatively small end surface. For this reason, when the externally-toothed gear shrinks, it is subjected to a larger frictional resistance force per unit area of the end surface from the furnace bed so as to prevent even shrinkage of the gear. The larger frictional resistance cooperates with the grain size and the density of the part to be sintered, and the surface roughness of the furnace bed, so as to generate uneven frictional resistance forces in circumferentially spaced positions, thereby deteriorating the roundness of the sintered externally-toothed gear.

According to the present invention, the externally-toothed gear is provided with a counter flange at one end thereof and, during sintering, is located on the furnace bed in such a manner that the large end surface of the counter flange is in contact with the surface of the furnace bed so as to reduce the frictional resistance force per unit area of the contact surface, thereby preventing the shrinking externally-toothed gear from being subjected to a large frictional resistance force which will deteriorate the roundness of the externally-toothed gear.

Further, the counter flange is advantageous as it acts to resist deformation of the externally-toothed gear and to keep the roundness thereof.

Similarly the secondary shaft is sintered without being subjected to a large frictional resistance force sufficient to deteriorate the roundness of the secondary shaft due to provision of a flange portion to enlarges the contact surface of the secondary shaft with the furnace bed.

The above and other objects, features and advantages of the present invention will become clear from the following description of the preferred embodiments taken in conjunction with the accompanying drawings.

DESCRIPTION OF THE PREFERRED EMBODIMENT

Figure 1:
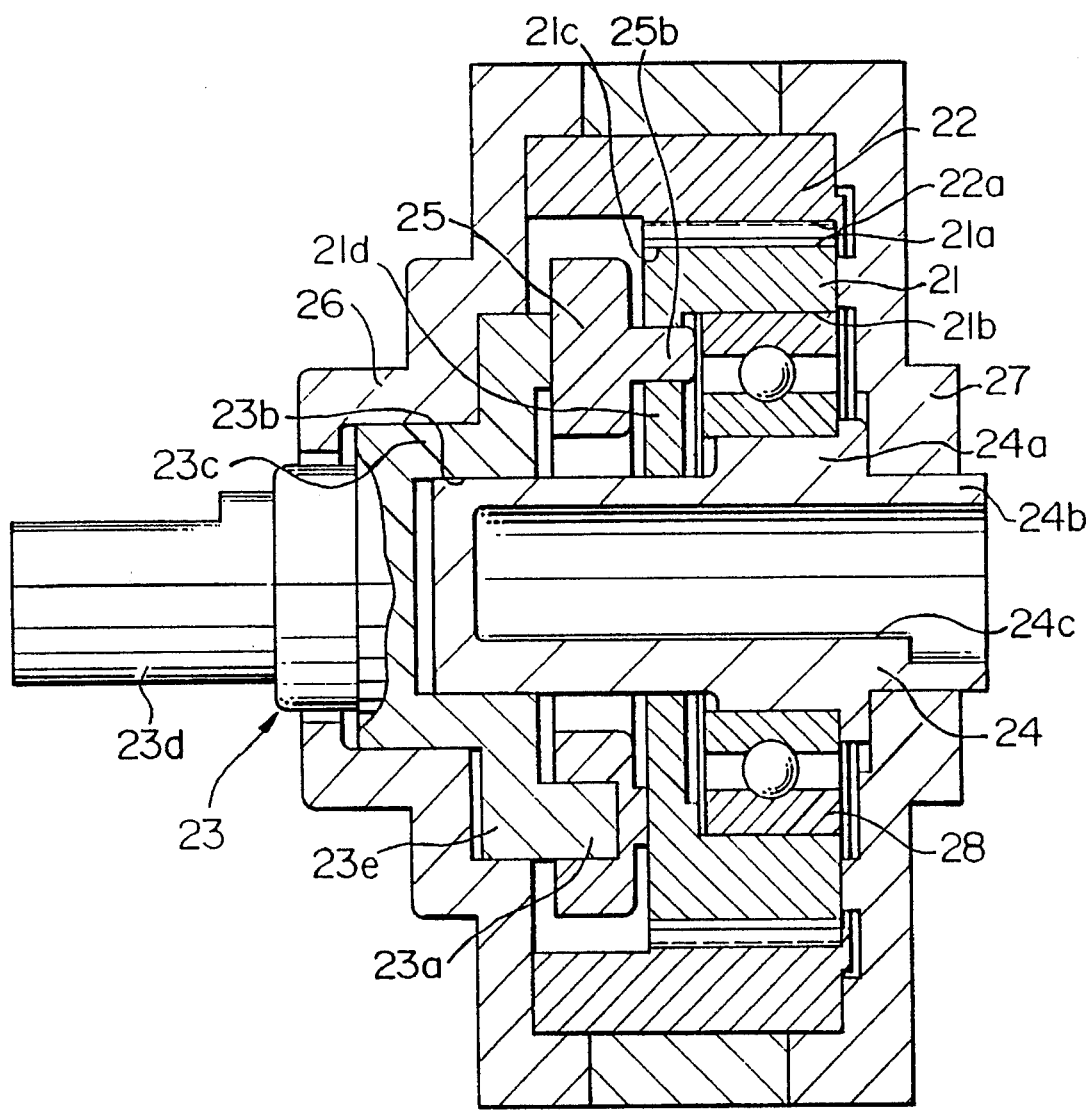
FIG. 1 is a schematic vertical sectional view of a speed reducer incorporating an embodiment of an inscribed planetary gear device according to the present invention.
Figure 2:
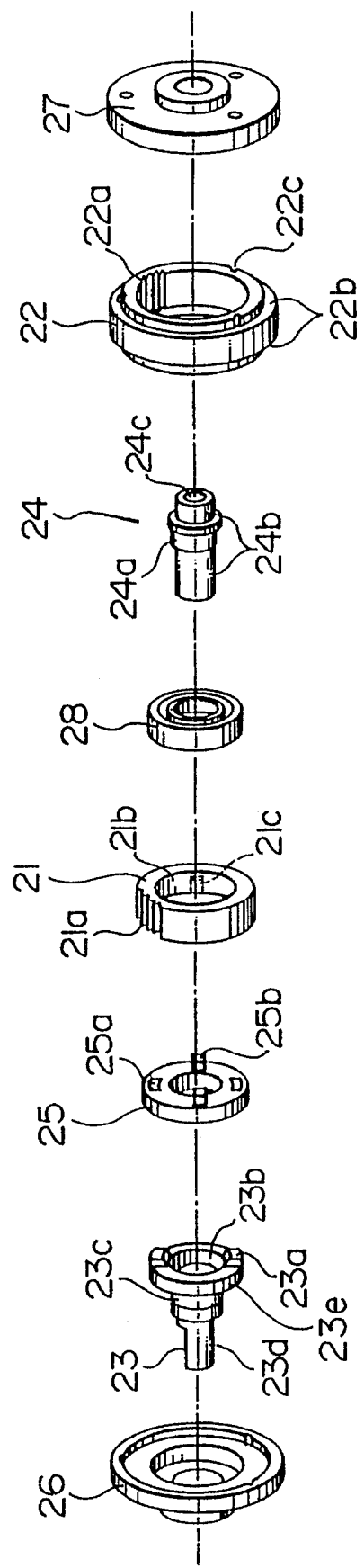
FIG. 2 is an exploded perspective view of the speed reducer shown in FIG. 1.
Figure 3:
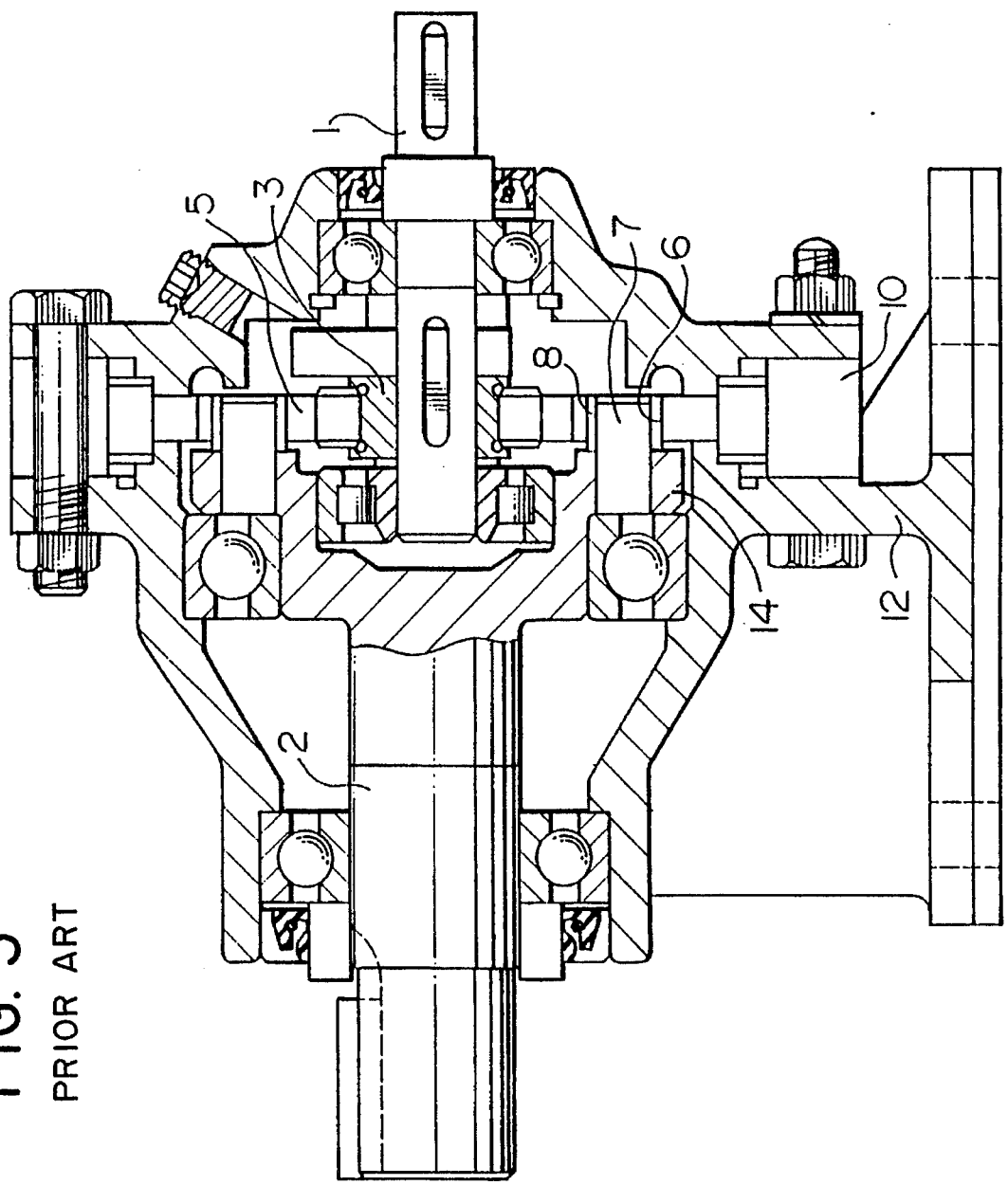
FIG. 3 is a sectional view of a speed reducer employing a known inscribed planetary gear structure.

Referring to FIGS. 1 and 2, a speed reducer has an inscribed planetary gear device of the invention which includes an externally-toothed gear 21, an internally-toothed gear 22, an output shaft 23 as a secondary shaft, an input shaft 24 as a primary shaft, an Oldham's ring 25, an output shaft cover 26, an inner cover 27 and a bearing 28.

The input shaft 24 is a hollow shaft having an internal bore 24c and an eccentric portion 24a.

An externally-toothed gear 21 is carried by the eccentric portion 24a of the input shaft 24 through the intermediary of a bearing 28. Bearing 28 is received in a bore 21b formed in the externally-toothed toothed gear 21. The externally-toothed gear 21 also has an Oldham's groove 21c which engages with an Oldham's projection 25b of the Oldham's ring 25. The teeth 21a of the externally-toothed gear 21 engage with teeth 22a on the internally-toothed gear 22. Numeral 22b denotes socket portions, while 22c denote holes for receiving tie bolts (not shown).

The Oldham's ring 25 includes the Oldham's groove 25a and the Oldham's projection 25b as explained before. The Oldham's projection 25b engages with the Oldham's groove 21c formed in the externally-toothed gear 21 as mentioned before, while the Oldham's groove 25a engages with the Oldham's projection 23a integral with the output shaft 23, thus forming an Oldham's mechanism which is known per se and which serves to transmit only the rotation of the externally-toothed gear 21 about the axis of this gear, while absorbing the revolving component of the movement of this gear.

Numeral 23b denotes a bore formed in a flange portion 23e of the output shaft 23, 23c denotes a cover-fitting portion, and 23d denotes a journal portion.

One full rotation of the input shaft 24 causes one full rotation of the eccentric portion 24a. As a result of rotation of the eccentric portion 24a, the externally-toothed gear 21 tends to revolve around the input shaft 24. The internally-toothed gear 22, however, prevents the externally-toothed gear 21 from rotating about its own axis. As a consequence, the externally-toothed gear 21 revolves while inscribing the internally-toothed gear 22, without itself making substantial rotation.

It is assumed here that the number of the teeth on the externally-toothed gear 21 is N, while the number of the teeth of the internally-toothed gear 22 is N+1, i.e., that the difference in the number of teeth between these two types of gears is 1. In this case, the rotational phase of the externally-toothed gear 5 is shifted by one pitch of the teeth of this gear 21 with respect to the internally-toothed gear 22 fixed to the casing 30, for each full rotation of the input shaft 24. Namely, the externally-toothed gear 21 rotates through an angle corresponding to one pitch of the teeth thereof. This means that one full rotation of the input shaft is reduced to −1/N rotation of the externally-toothed gear. Any revolving component of the movement of the externally-toothed gear 21 is absorbed by the Oldham's ring 25, so that only the rotation of the gear 21 about its own axis is transmitted to the output shaft 23, thus accomplishing speed reduction at a ratio of −1/N.

The inscribed planetary gear device of the invention as described above is featured by forming a part or parts thereof, such as the externally-toothed gear 21, the internally-toothed gear 22, the Oldham's ring 25 and the output shaft 23, by a process which includes metal powder injection molding. When these parts are sintered from the state of a brown part to the state of a white part, they largely shrunk and tend to be largely distorted, unless they are placed on a furnace bed with a large contact surface therebetween, as described before. In order to eliminate this problem, the externally-toothed gear 21 is provided with a counter flange 21d at the end facing the Oldham's ring 25, and the Oldham's groove 21c is formed in the counter flange 21d.

Figure 4:
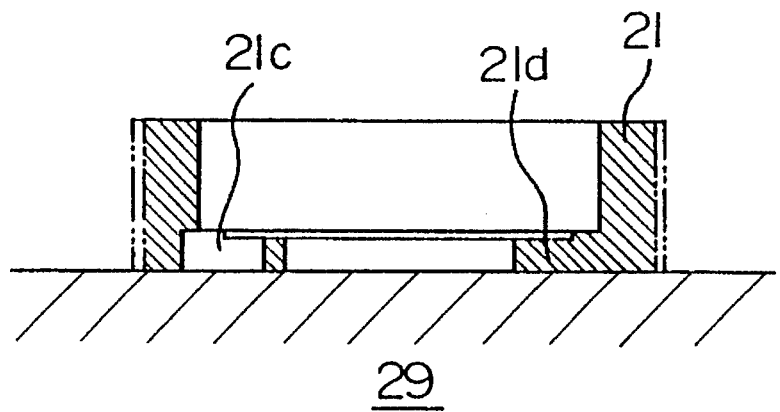
FIG. 4 is a sectional view showing the sintering of an externally-toothed gear of the device in FIG. 1 on a furnace bed.

When this externally-toothed gear 21 is sintered on the furnace bed, it is placed on the furnace bed 29 so that contact the surface of the counter flange 21d contacts the surface of the furnace bed 29, as shown in FIG. 4. Under this condition, the total weight of the externally-toothed gear 21 is applied through the large counter flange 21d to the furnace bed 29 so as to reduce the downward force per unit area of the contact surface and thus the external-toothed gear 21 will be more uniformly shrunk during sintering without being subjected to a large frictional resistance force from the bed 29, thereby preventing the distortion or deterioration of the roundness of the externally-toothed gear 21.

Similarly, the output shaft 23 can be sintered, without causing distortion or deterioration of the roundness thereof, by placing the output shaft 23 on the furnace bed 29 in such a manner that the front surface of the flange portion 23e is in contact with the surface of the furnace bed 29 during sintering. In this case, since the front surface of the flange portion 23e has Oldham's projections 23a, it is needed to form on the surface of the furnace bed recesses for loosely receiving Oldham's projections 23a so as not to prevent the shrinkage of the flange portion 23e.

The Oldham's ring 25 can be easily sintered without causing distortion by placing the flat surface of the Oldham's ring 25, having no projections in contact with the furnace bed.

Figure 5:
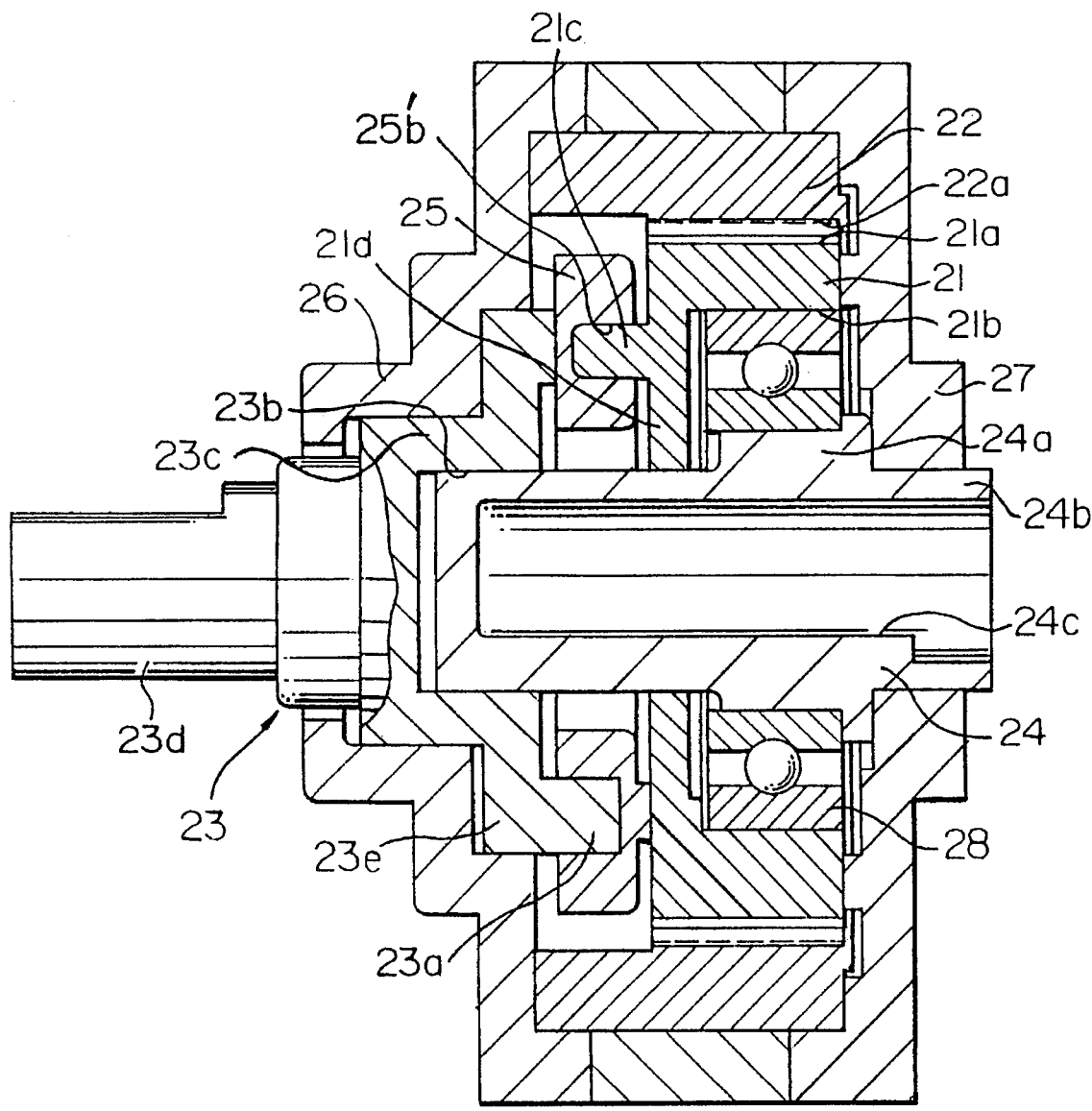
FIG. 5 is a schematic vertical sectional view of a speed reducer incorporating another embodiment of an inscribed planetary gear device made according to the present invention.

FIG. 5, shows another embodiment of the inscribed planetary gear device according to the present invention which has the same construction as the embodiment shown in FIG. 1, except that the Oldham's projections 21'c project from the counter flange 21d of the externally-toothed gear 21 and Oldham's grooves 25'b, for receiving Oldham's projections 21'c, are formed in the Oldham's ring 25. It will be clear for a person of ordinary skill in the art that this device in FIG. 5 operates in same manner as the device as shown in FIG. 1.

Figure 6:
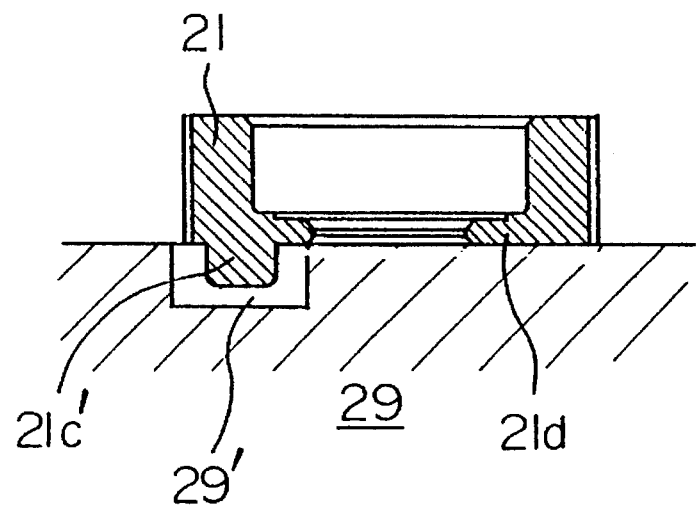
FIG. 6 is a sectional view showing the sintering of an externally-toothed gear of the device in FIG. 5 on a furnace bed.

When the externally-toothed gear 21 shown in FIG. 5 is to be sintered, it is placed on a furnace bed 29 which has recesses 29' on its surface in such a manner that the side surface of the counter flange 21d is in contact with the furnace bed surface while the Oldham's projections 21'c are inserted into the recesses 29', as shown in FIG. 6. During sintering, the externally-toothed gear 21 can be uniformly shrunk because it contacts the furnace bed 29 through the counter flange 21d with a large contact surface so as to decrease the frictional resistance force per unit area, and the Oldham's projections 21'c are allowed to freely move within the recesses 29'.

Alternatively, only the teeth 21a, the bearing-receiving portion 21b and the portion providing the Oldham's groove 21c of the externally-toothed gear 21 may be formed in one shot by metal powder injection molding which was described before.

As to the internally-toothed gear 22, only the teeth 22a, socket portions 22b, and tie-bolt holes 22c may be formed in one shot by metal powder injection molding.

Similarly, only the Oldham's projection 23a, bore 23b in the flange, cover-fitting portion 23c and the journal portion 23d of the output shaft 23 may be formed in one shot by metal powder injection molding.

In the input shaft 24, only the eccentric portion 24a, the journal portion 24b and the portion defining the bore 24c may be formed in one shot by metal powder injection molding.

As to the Oldham's ring 25, only the portions forming the Oldham's groove 25a and the Oldham's projection 25d may be formed in one shot by metal powder injection molding.

By virtue of the use of the metal powder injection molding technique, it is possible to obtain a speed reducer which is small in size but yet capable of transmitting large amount of power. The reduction in the size of the speed reducer correspondingly reduces the peripheral velocities of the gears and, hence, friction between meshing gear teeth. The use of a metal powder as the gear material, despite the reduced sizes of the gears, permits transmission of much greater amounts of power as compared with the case where the gears are made of plastics.

It is possible to use a high-strength metal material, e.g., JIS SKH (high-speed steel) or SUJ (steel for bearing) material, provided that the requirements for dimensional precision are met. In this case, the ability to transmit further greater power can be obtained without requiring specific heat treatment of the formed gear parts.

The present invention also enables mass-production at a reduced cost, by virtue of the one-shot molding, which completely eliminates or reduces mechanical processing.

Furthermore, the device of the present invention can withstand a long continuous operation since the parts thus made can sustain use at temperatures higher than those for parts made of plastics.

Although the invention has been described through its preferred forms, it is to be understood that the described embodiments are only illustrative and various changes and modifications may be imparted thereto.

For instance, the metal powder injection molding may be applied only to specific portions of specific parts, although in the described embodiments all the critical portions of almost all major parts are formed by the metal powder injection molding.

As will be understood from the foregoing description, according to the present invention, it is possible to obtain an inscribed planetary gear device which is small in size but yet capable of transmitting large amounts of power, while withstanding long continuous operation, and which can be mass-produced at a reduced cost. These advantages are enjoyed also in speed reducers or overdrives which incorporate the inscribed planetary gear devices of the invention.

What is claimed is:

1. An inscribed planetary gear device, comprising: a primary shaft; an externally-toothed gear having an axially extending cylindrical bore fitted around a bearing carried at an eccentricity by said primary shaft; an internally-toothed gear inscribed by said externally-toothed gear; a secondary shaft extending coaxially with said primary shaft; and an Oldham's ring disposed between said externally-toothed gear and said secondary shaft for transmitting to said secondary shaft only the rotation of said externally-toothed gear taking place about the axis of said externally-toothed gear; wherein said Oldham's ring is formed with at least one Oldham's projection projecting toward said externally-toothed gear, said externally-toothed gear is provide with a counter flange at an end thereof on the sides of said Oldham's ring to extend radially inwardly, said flange being formed with at least one Oldham's groove to receive said Oldham's projection, and said externally-toothed gear is formed by metal powder injection molding so as to prevent distorted and deterioration of the roundness of said externally-toothed gear.

2. An inscribed planetary gear device according to claim 1, wherein said secondary shaft has unitary structure comprising a journal portion, a cover fitting portion and a flange portion extending radially outwardly from a distal end of said cover fitting portion, said flange portion being formed with at least one second Oldham's projection projecting toward said Oldham's ring and received by at least one second Oldham's groove formed in said Oldham's ring and an inner bore rotatably receiving said primary shaft, and said secondary shaft is formed by metal powder injection molding.

3. An inscribed planetary gear device according to claim 2, wherein said Oldham's ring is formed by metal powder injection molding.

4. An inscribed planetary gear device, comprising: a primary shaft; an externally-toothed gear having an axially extending cylindrical bore fitted around a bearing carried at an eccentricity by said primary shaft; an internally-toothed gear inscribed by said externally-toothed gear; a secondary shaft extending coaxially with said primary shaft; an Oldham's ring disposed between said externally-toothed gear and said secondary shaft for transmitting to said secondary shaft only the rotation of said externally-toothed gear taking place about the axis of said externally-toothed gear; wherein said Oldham's ring is formed with at least one Oldham's groove and said externally-toothed gear is provided with a counter flange at an end thereof on the sides of said Oldham's ring to extend radially inwardly, said flange being formed with at least one Oldham's projection projecting toward said Oldham's ring and received by said Oldham's groove, and said externally-toothed gear is formed by metal powder injection molding so as to prevent distortion and deterioration of the roundness of said externally-toothed gear.

5. An inscribed planetary gear device according to claim 4, wherein said secondary shaft has a unitary structure comprising a journal portion, a cover fitting portion and a flange portion extending radially outwardly from a distal end of said cover fitting portion, said flange portion being formed with at least one second Oldham's projection projecting toward said Oldham's ring and received by at least one second Oldham's groove formed in said Oldham's ring and an inner bore rotatably receiving said primary shaft, and said secondary shaft is formed by metal powder injection molding.

6. An inscribed planetary gear device according to claim 5, wherein said Oldham's ring is formed by metal powder injection molding.

* * * * *